United States Patent [19]

Tanaka

[11] Patent Number: 5,249,173
[45] Date of Patent: Sep. 28, 1993

[54] GALVANOMIRROR UNIT

[75] Inventor: Akihiro Tanaka, Tokyo, Japan

[73] Assignee: Asahi Kogaku Kogyo Kabushiki Kaisha, Tokyo, Japan

[21] Appl. No.: 808,689

[22] Filed: Dec. 17, 1991

[30] Foreign Application Priority Data

Dec. 17, 1990 [JP] Japan .............. 2-406426[U]

[51] Int. Cl.⁵ .............................. G11B 7/95
[52] U.S. Cl. ................... 369/119; 359/221; 359/223
[58] Field of Search ........... 369/119. 118, 100; 359/223, 212, 213, 214. 221, 198, 838, 846, 848, 821, 822

[56] References Cited

U.S. PATENT DOCUMENTS

| | | | |
|---|---|---|---|
| 2.108.815 | 2/1938 | Gille et al. | 369/119 |
| 2.189.311 | 2/1940 | Dimmick | 369/119 |
| 2.423.285 | 7/1947 | Badmaieff | 369/119 |
| 3.885.094 | 5/1975 | Russell | 369/44.17 |
| 4.268.129 | 5/1981 | Araki | 369/119 |
| 4.564.757 | 1/1986 | LaBudde et al. | 369/54 |
| 4.589.102 | 5/1986 | Volleau et al. | 369/119 |
| 4.607.356 | 8/1986 | Bricot et al. | 369/119 |

FOREIGN PATENT DOCUMENTS

| | | |
|---|---|---|
| 60-40029 | 3/1985 | Japan . |
| 61-137234 | 6/1986 | Japan . |
| 62-143236 | 6/1987 | Japan . |
| 63-160024 | 7/1988 | Japan . |
| 63-311225 | 12/1988 | Japan . |

OTHER PUBLICATIONS

English Abstract to Japanese Patent No. 61-137234.
English Abstract to Japanese Patent No. 62-143236.
English Abstract to Japanese Patent No. 63-160024.
English Abstract to Japanese Patent No. 63-311225.
English Abstract to Japanese Patent No. 60-40029.

Primary Examiner—Paul M. Dzierzynski
Assistant Examiner—Kiet T. Nguyen
Attorney, Agent, or Firm—Sandler Greenblum & Bernstein

[57] ABSTRACT

A galvanomirror unit including a galvanomirror for reflecting a laser beam and a driving mechanism which adjusts the position of the galvanomirror to change the direction of light reflected by the galvanomirror. The driving mechanism includes a torsion spring to which the galvanomirror is secured and which is made of a leaf spring lying in a plane substantially parallel with the direction of gravity when in a free state.

29 Claims, 5 Drawing Sheets

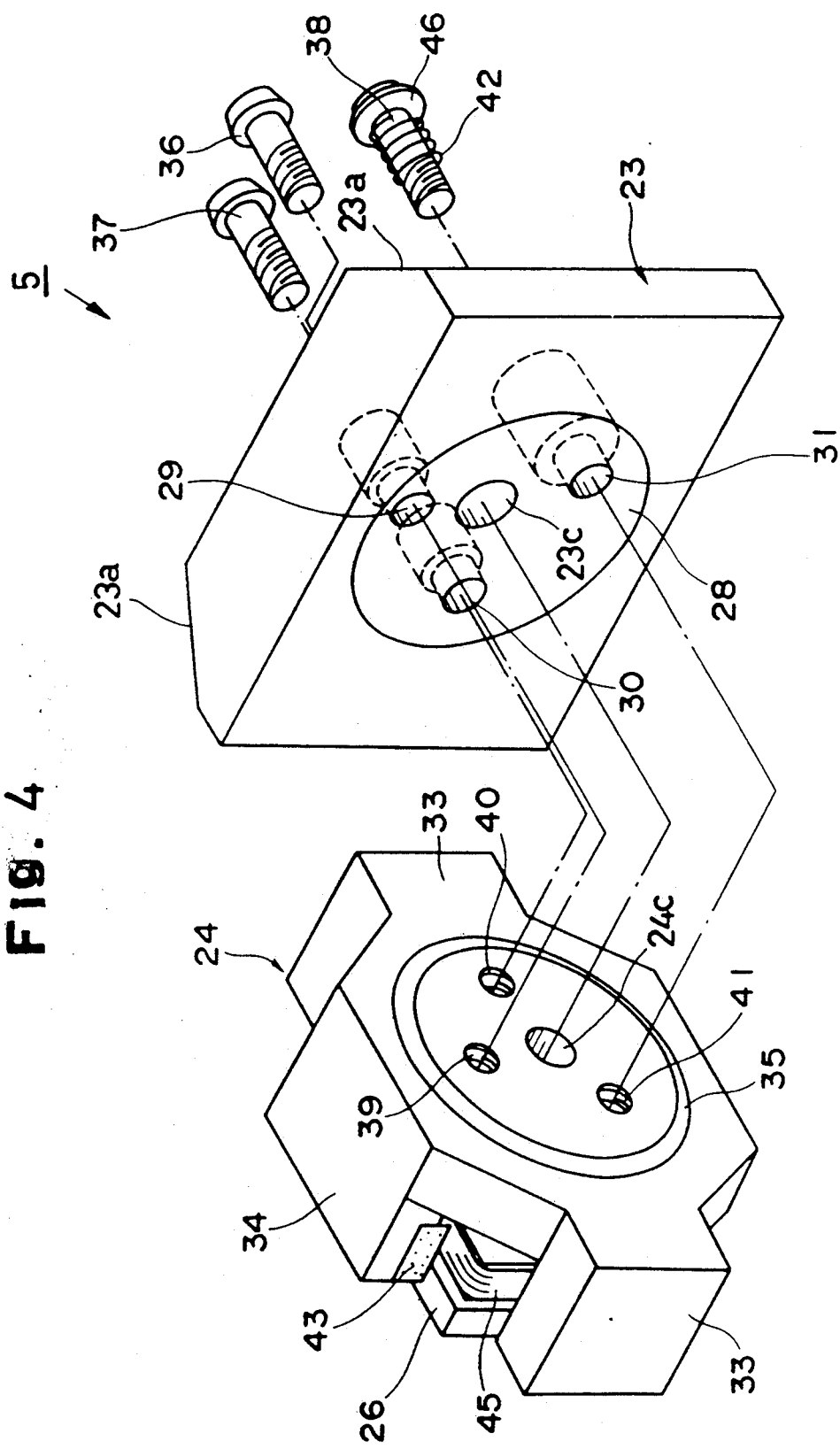

GALVANOMIRROR UNIT

BACKGROUND OF THE INVENTION

1. Field of the Invention

The present invention relates to an optical disc apparatus, such as an optical information recording and reproducing apparatus or optical information reproducing apparatus for recording information on an optical disc, such as a photo magnetic disc, and/or reproducing the recorded information. More specifically, the present invention relates to a galvanomirror unit incorporated in an optical system thereof.

2. Description of Related Art

In a known optical apparatus, an objective lens, which converges a laser beam from a laser source onto an optical disc and/or receives the light reflected from the optical disc, is linearly moved across the tracks of the optical disc in the radial direction. A known optical disc apparatus usually includes a galvanomirror unit for adjusting the laser beam emitted from the laser source, so as to make the beam parallel with the direction of movement of the objective lens within a vertical plane lying in the radial direction of the optical disc. The galvanomirror unit has a galvanomirror which rotates to vary the direction of reflection of the laser beam with respect to the objective lens.

If a positional deviation occurs between the focal point of the laser beam on the optical disc and the track of the optical disc, the reflecting surface of the galvanomirror is rotated about a horizontal axis and is deflected within the vertical plane (pitch direction) in accordance with a tracking error signal issued from a servo-sensor which detects light reflected by the optical disc, so that the optical axis of the reflected laser is lo deflected in the vertical plane due to the change in the angular direction of the reflecting surface. As a result, the focal point (convergence point) of the laser beam on the optical disc is slightly adjusted in the radial direction (cross-track direction) to absorb the positional deviation, thereby carrying out the tracking operation.

In such a known optical disc apparatus, the galvanomirror is supported by an elastic member so that the inclination angle of the reflecting surface of the galvanomirror may be adjusted about a horizontal axis. However, the elastic support tends to bend downward due to the weight of the galvanomirror causing the initial position (normal state) of the galvanomirror to vary, which may, for example, result in a deviation from the vertical plane. Consequently, it is necessary for the control mechanism to apply some external force to the galvanomirror so as to maintain the galvanomirror's angular position in some predetermined initial state. This complicates the control mechanism. Furthermore, precise control of the galvanomirror inclination angle cannot be effected when the elastic support is initially deformed because an irregular (i.e., unsteady or asymmetric) force is required for angular adjustment of the galvanomirror.

SUMMARY OF THE INVENTION

The primary object of the present invention is to provide a galvanomirror unit in which the above-mentioned drawbacks of the prior art are eliminated and a precise control of a galvanomirror can be easily carried out.

To achieve the object mentioned above, according to an aspect of the present invention, a galvanomirror unit comprising a galvanomirror for reflecting a laser beam and a driving mechanism which changes the direction of the galvanomirror to change the direction of light reflected by the galvanomirror are provided. The driving mechanism comprises a torsion spring to which the galvanomirror is secured, the torsion spring being made of a leaf spring which lies in a plane substantially parallel with the direction of gravity in a free (i.e. non-deformed) state.

According to another aspect of the present invention, an optical disc apparatus comprising a laser source for emitting a laser beam, a galvanomirror unit which includes a galvanomirror for reflecting the laser beam onto an optical disc, and a driving mechanism for changing the direction of the galvanomirror are provided to vary the direction of light reflected by the galvanomirror. The driving mechanism comprises a torsion spring, to which the galvanomirror is secured, made of a leaf spring which lies in a plane substantially parallel with the direction of gravity in a free state.

According to still another aspect of the present invention, an optical disc apparatus comprising a light gathering optical system for gathering light to be made incident upon an optical disc is provided. A galvanomirror unit, within the light gathering optical system, includes a galvanomirror whose angular position is varied to accurately collect the laser beam onto a predetermined track of the optical disc in accordance with a tracking error signal corresponding to an off-set value resulting from a deviation of the laser from the track. The galvanomirror unit comprises a torsion spring to which the galvanomirror is secured. The torsion spring is made of a leaf spring which lies in a plane substantially parallel with the direction of gravity in a free state.

According to still another aspect of the present invention, a galvanomirror unit, in which a laser beam from a laser source is reflected toward an objective lens, which is linearly moved along the tracks of an optical disc in the radial direction thereof, comprises a torsion spring in the form of a leaf spring which is fixedly supported at its opposite ends and lies in a plane substantially parallel with the direction of gravity. A galvanomirror is supported on the intermediate portion of the torsion spring to be angularly deflected about a horizontal axis.

With the construction mentioned above, since the mirror is supported on the intermediate portion of the torsion spring, which is in the form of a leaf spring and which lies in a plane parallel with the direction of the gravity so as to be deflected about a horizontal axis, deformation of the torsion spring due to the weight of the galvanomirror does not occur. Therefore, the angular adjustment of the galvanomirror can be easily and precisely effected.

The present disclosure relates to subject matter contained in Japanese Utility Model Application No. 2-406426 (filed on Dec. 17, 1990) which is expressly incorporated herein by reference in its entirety.

BRIEF DESCRIPTION OF THE DRAWINGS

The invention will be described below in detail with reference to the accompanying drawings, in which;

FIG. 4 is an exploded perspective view of a galvanomirror unit, as shown in FIG. 2;

DESCRIPTION OF THE PREFERRED EMBODIMENTS

Figure 1:
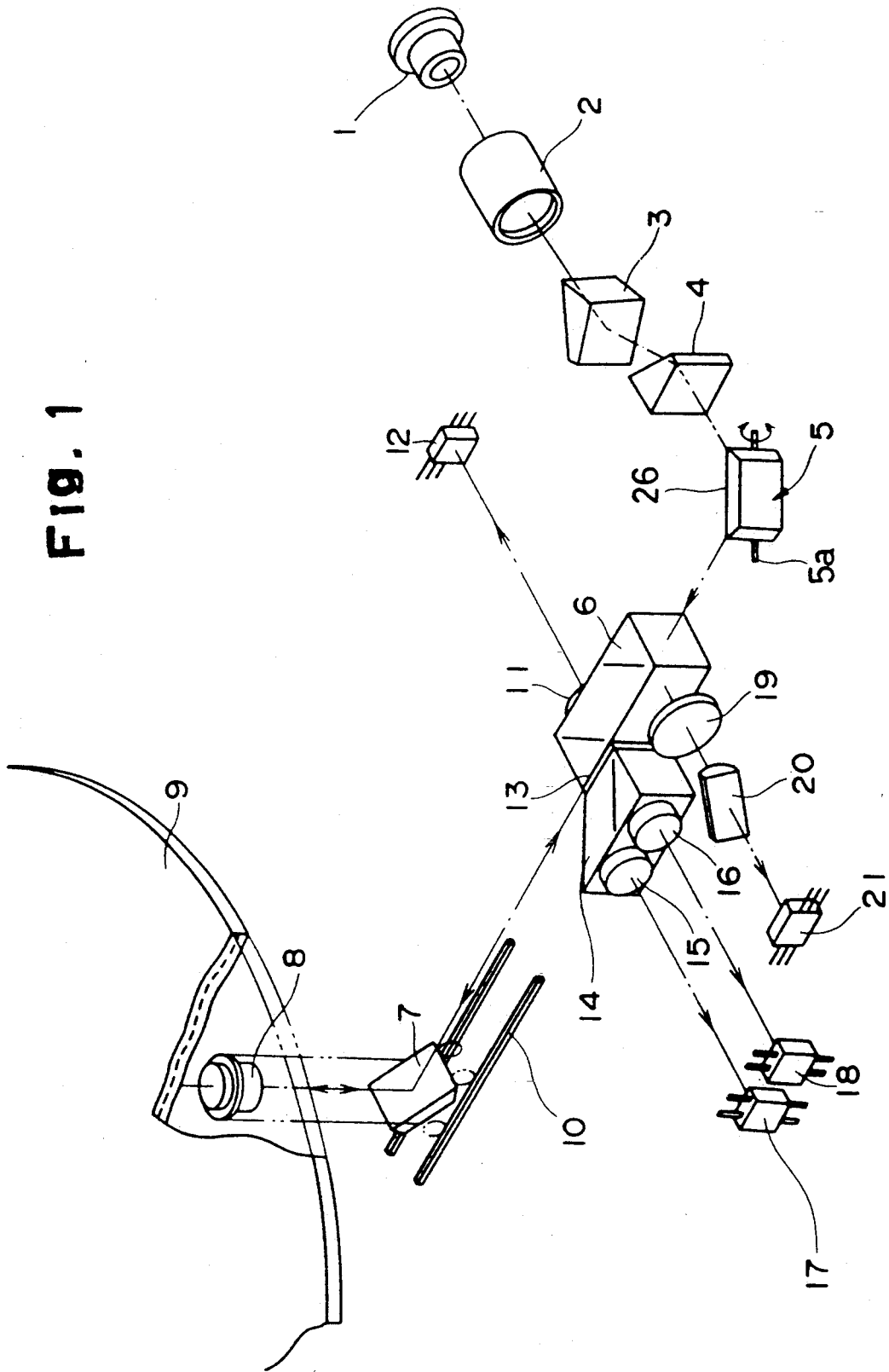
FIG. 1 is an exploded schematic perspective view of an optical disc apparatus having a galvanomirror unit according to the present invention.
Figure 2:
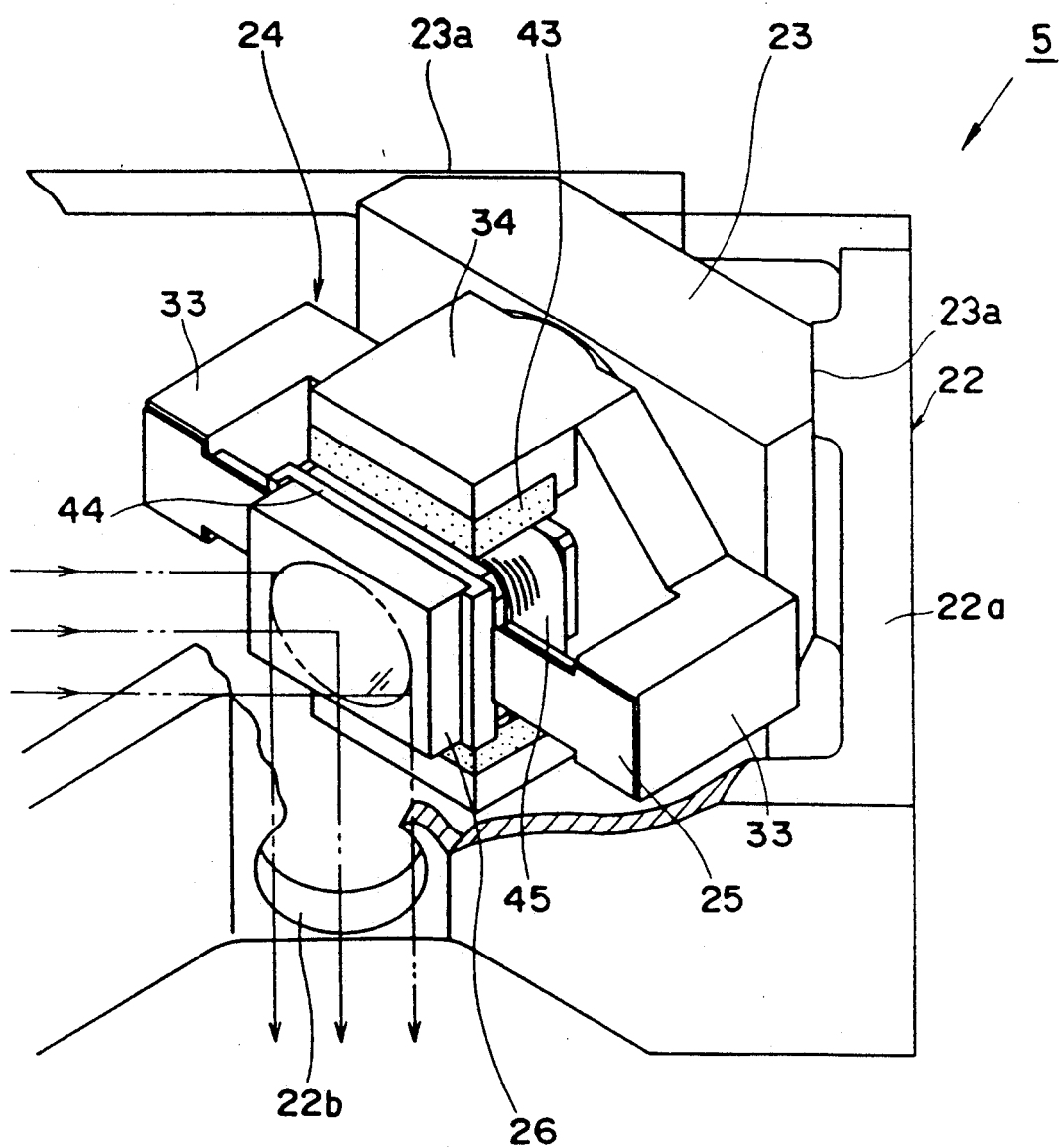
FIG. 2 is a perspective view of a galvanomirror unit according to the present invention.
Figure 3:
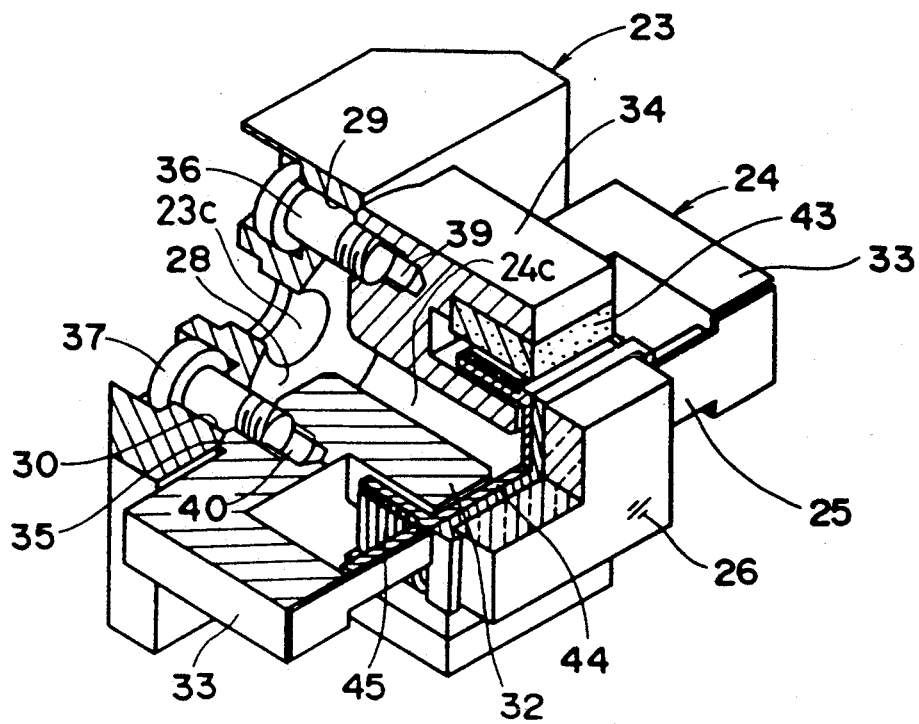
FIG. 3 is a partially broken perspective view of a galvanomirror unit, as shown in FIG. 2.
Figure 6:
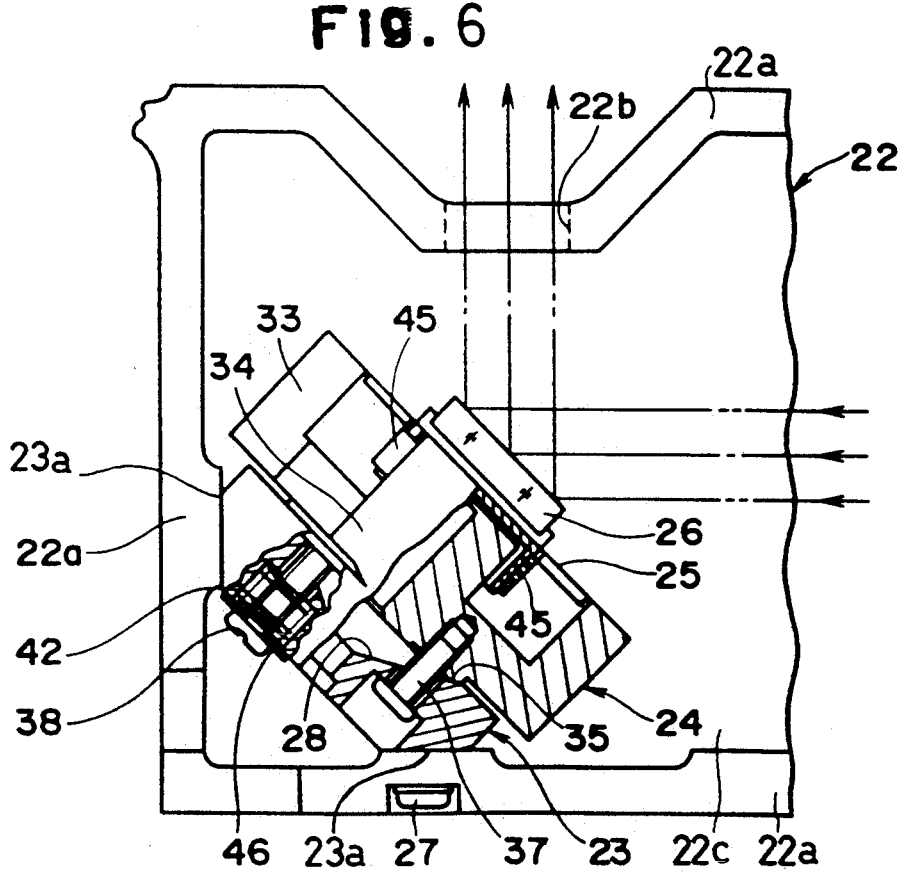

FIG. 1 shows an optical disc apparatus to which the present invention is applied. In FIG. 1, the laser beam emitted from a laser source 1, such as a semiconductor laser or the like, is collimated by a collimating lens 2 and is then shaped into a circular light flux by first and second beam shaping prisms 3 and 4 to be made incident upon a galvanomirror unit 5.

Light reflected by the mirror 26 of the galvanomirror unit 5 is transmitted through a main beam splitter 6 and is then reflected by a movable mirror 7 and focused on the optical disc 9 by an objective lens 8. The movable mirror 7 and the objective lens 8 are integrally supported by a supporting member (not shown) which is linearly moved on and along guide rails 10 extending in the radial direction of the optical disc 9 across spiral or concentric tracks of the optical disc 9.

The light reflected by the galvanomirror unit 5 is partly reflected by the main beam splitter 6 to be made incident upon an APC (Auto Power Control) sensor 12 through a condenser lens 11 for controlling the laser output.

The light reflected by the optical disc 9 is again reflected by the movable mirror 7 and then made incident upon the main beam splitter 6 from the opposite direction. The main beam splitter 6 splits the light into light which is incident upon an auxiliary beam splitter 14 through a ½wave plate 13 and light which is reflected by the main beam splitter 6 to be made incident upon a servo-sensor 21 for controlling focusing and tracking through a condenser lens 19 and a cylindrical lens 20. The light incident upon an auxiliary beam splitter 14 is split to be made incident upon an S-polarized light data sensor 17 and a P-polarized light data sensor 18, for reproducing the signals, through condenser lenses 15 and 16, respectively.

In the event of a tracking error, i.e., when light is not correctly focused on a predetermined track of the optical disc 9 (out of focus), the galvanomirror unit 5 rotates about a horizontal shaft 5a changing the angle of the reflecting surface of the mirror 26 with respect to a vertical plane (pitch direction) in accordance with the tracking error signal output from the servo-sensor 21. As a result, the position of the laser beam focal point on the optical disc 9 is slightly adjusted in the radial direction (cross-track direction) to correct the tracking error, thereby carrying out the tracking function.

The following discussion will be directed to the internal construction of the galvanomirror unit 5 by way of example.

A housing 22 of the galvanomirror unit 5 has a substantially square bottom plate 22c and vertical side walls 22a. A retainer 23 is provided on one corner of the housing 22, and a yoke 24 is mounted to the retainer 23. The mirror 26 (reflecting surface) is supported by a torsion spring 25 which is supported at opposite ends thereof by the yoke 24.

The retainer 23, which is located at one corner of the housing 22 at an angle of 45°, as mentioned above, has a pair of orthogonal side surfaces 23a which are inclined at an angle of 45° with respect to the mirror 26 and which are in contact with the associated vertical side walls 22a. The retainer 23 is secured to the housing 22 by a set screw 27, extending through the bottom plate 22c, and the associated vertical side wall 22a. The retainer 23 is provided on its front face with a conical recess 28 which has three holes 29, 30 and 31 extending therethrough.

Figure 5:
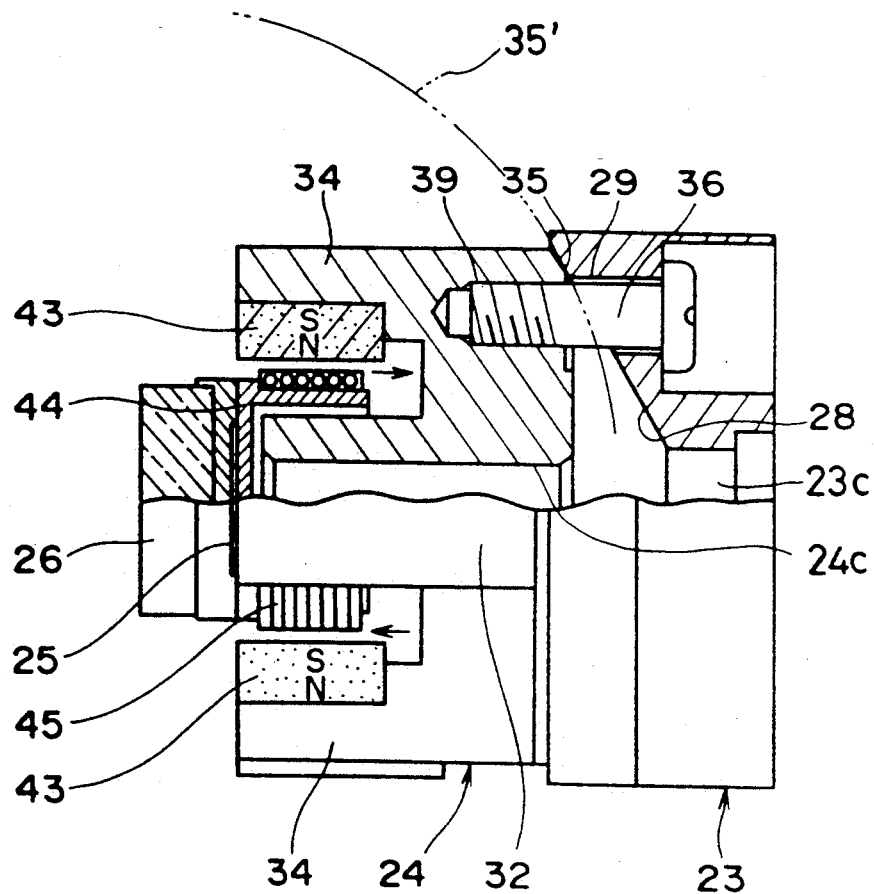
FIG. 5 is a longitudinal sectional view of a galvanomirror unit, as shown in FIG. 2; and, FIG. 6 is a partially sectioned plan view of a galvanomirror unit attached to a casing, as shown in FIG. 2.

The yoke 24 has a central projection 32 and right and left projections 33 and upper and lower projections 34 on opposite sides of the central projection 32 in the horizontal and vertical directions, so that the yoke is generally E-shaped in both the horizontal and vertical cross-sections. The yoke 24 is provided on its rear surface with a spherical zone projection 35 defined by a spherical segment truncated by a smaller spherical segment cut by a plane parallel to the surface 33. The spherical zone projection 35 can be fitted in the conical section recess 28 of the retainer. The spherical zone projection 35 is part of an imaginary sphere 35' (FIG. 5), the center of which lies in the plane of the reflecting surface of mirror 26. The spherical zone projection 35 is in movable contact with the inner surface of the conical recess 28 of the retainer 23. Three adjusting screws 36, 37 and 38 are screwed in the yoke 24 through holes 29, 30 and 31 formed in the retainer 23 from behind, so that the yoke 24 is integrally supported by the retainer 23. Thus, enabling the initial adjustment of the angular position of the yoke 24 in the vertical direction (i.e., the direction corresponding to rotation about a horizontal axis) and horizontal direction (i.e., the direction corresponding to rotation about a vertical axis).

Namely, the first hole 29 is located directly above the center axes 23c and 24c connecting the centers of the retainer 23 and the yoke 24 in the vertical direction. The second hole 30 is located in the same horizontal plane as the center axes 23c and 24c, and the third hole 31 is located at a corner of an isosceles triangle of which the two remaining corners lie on the axes of the first and second holes 29 and 30. The vertical adjustment screw 36 is inserted through the first hole 29 and screwed into a threaded hole 39 formed in the rear surface of the yoke 24. The horizontal adjustment screw 37 is inserted into the second through hole 30 and screwed into a threaded hole 40 formed in the rear surface of the yoke 24, to secure the yoke 24 to the retainer 23. The final adjustment screw 38 is inserted through the third hole 31 and screwed into a threaded hole 41 formed in the rear surface of the yoke 24 through a washer 46. A compression spring 42 is provided between the washer 46 and the seat of the retainer 23 to bias the yoke 24 against the retainer 23 through the final adjustment screw 38 upon adjustment. The yoke 24 and the retainer 23 are forcibly engaged by the bias of the compression spring 42 with a pressure which is dependent upon the depth that the adjusting screws 36 and 37 are engaged. Upon completion of the horizontal and vertical adjustments, the final adjustment screw 38 is screwed-in to further compress the compression spring 42, thereby forcing the washer 46 against the retainer 23, so that the retainer 23 and the yoke 24 are firmly held together by the final adjustment screw 38.

The three adjusting screws, i.e., the vertical adjustment screw 36, the horizontal adjustment screw 37 and the final adjustment screw 38 are provided within the spherical zone projection 35.

The yoke 24 is provided with permanent magnets 43 on the inwardly facing surfaces of the upper and lower horizontal projections 34 which are spaced in the vertical direction. The torsion spring 25, which is in the form of an elongated leaf spring and which is provided on the front surface of the yoke 24, extends in the horizontal direction. The plane of the leaf spring 25 lies in a vertical plane and is connected at the opposite ends thereof to the right and left projections 33. The intermediate portion of the torsion spring 25 is provided with the mirror 26 on the front surface thereof. The surface of the mirror 26 lies in a plane which cuts the imaginary sphere 35' of the spherical zone projection 35 into two hemispheres. At the intermediate portion on the rear surface of the torsion spring 25 a frame (bobbin) is mounted thereto and surrounds the central projection 32. A coil 45 is wound around the frame 44. The coil 45 works in conjunction with the permanent magnets 43 on the projections 34 of the yoke 24 to constitute a voice coil connected to a servo circuit which is connected to the servo-sensor 21, as shown in FIG. 1.

The housing 22 is provided with a window 22b through which the laser beam passes, so that the light reflected by the mirror 26 is emitted toward the beam splitter 6 through the window 22b.

As can be seen from the foregoing, according to the present invention, if a tracking error signal is output from the servo-sensor 21, in accordance with the light reflected from the optical disc 9, the electric current corresponding to the tracking error signal is supplied to the coil 45 of the galvanomirror unit 5. As a result of the operation of the voice coil, defined by the coil 45 and the permanent magnets 43, the upper and lower portions of the frame are alternately moved backwards and forwards and at different angular displacements depending on the direction and intensity of the electric current supplied to the coil 45, respectively, so that a torsional deformation of the torsion spring 25 takes place. Namely, the torsion spring 25 rotates about a horizontal axis which lies within the incident plane of the laser. Thus, the angular displacement of the mirror 26, mounted to the torsion spring 25 is controlled to adjust the tracking deviation.

In the galvanomirror unit, as constructed above, since the torsion spring 25, in the form of a leaf spring, is secured at the opposite ends thereof to the yoke 24 in such a way that the plane of the leaf spring lies in a vertical plane parallel with the direction of gravity, downward deformation or distortion of the torsion spring 25, due to the weight of the galvanomirror 26, which is supported on the intermediate portion of the torsion spring, does not occur. Therefore, there is no deviation in the central position of the galvanomirror 26. The leaf spring has the largest section modulus when it lies in a plane parallel with the direction of gravity, as can be understood from the viewpoint of mechanics of materials. Namely, the leaf spring, lying in the vertical plane, tends not to deform in the direction of gravity. Consequently, it is not necessary for the drive mechanism to supply an external force to the galvanomirror to stabilize its vertical position. Furthermore, the galvanomirror can be deflected into and out of the vertical plane with a uniform force by the servo-operation. This ensures a simple and precise control of the angular displacement of the galvanomirror unit.

What is claimed is:

1. A galvanomirror unit comprising a galvanomirror for reflecting a laser beam, a driving mechanism which varies a direction of said galvanomirror to adjust the direction of light reflected by said galvanomirror, wherein said driving mechanism comprises:

a torsion spring to which said galvanomirror is secured, said torsion spring being made of a leaf spring and having a major surface lying in a plane substantially parallel with a direction of gravity when in a free state, and means for mounting said torsion spring to a support structure, said mounting means including a spheric zone section defined with respect to one of said support structure and said torsion spring, and a mating recess defined with respect to the other one of said support structure and said torsion spring.

2. A galvanomirror unit according to claim 1, comprising:

an immovable portion to which opposite ends of said torsion spring are secured.

3. A galvanomirror unit according to claim 2, wherein said galvanomirror is secured to an intermediate portion of said torsion spring.

4. A galvanomirror unit according to claim 2, further comprising:

an electromagnetic drive mechanism provided between said torsion spring and said immovable portion to twist said torsion spring and thereby change the direction of said galvanomirror.

5. A galvanomirror unit according to claim 4, further comprising:

a housing and a retainer, wherein said retainer is secured to said housing to support said galvanomirror.

6. A galvanomirror unit according to claim 5, wherein said immovable portion is made of a yoke which is supported on said retainer and adjustable with respect to said retainer.

7. A galvanomirror unit according to claim 6, wherein said retainer comprises:

a pair of orthogonal surfaces which are oriented at 45° angles with respect to said torsion spring.

8. A galvanomirror unit according to claim 7, wherein said housing comprises:

a pair of wall surfaces against which said corresponding orthogonal surfaces of said retainer abut.

9. A galvanomirror unit according to claim 7, further comprising:

an initial position adjusting mechanism between said retainer and said yoke including an abutting portion provided on a surface of said yoke opposed to said galvanomirror, said abutting portion being in a shape of a spheric zone section, wherein a center of an imaginary sphere, of which said spheric zone is a part, lies in a plane of a reflecting surface of said galvanomirror, a recess provided on said retainer to come into contact with said abutting portion, and a fastening device for fastening said yoke and said retainer.

10. A galvanomirror unit according to claim 9, wherein said fastening device comprises:

three adjusting screws which are screwed in said yoke through said retainer.

11. A galvanomirror unit according to claim 10, wherein said three adjusting screws are located at corners of an isosceles equilateral triangle.

12. A galvanomirror unit according to claim 11, wherein two of said three adjusting screws are positioned to form a right angle with a center of said abutting portion, a corner of said right angle being located at said center of said abutting portion.

13. A galvanomirror unit according to claim 12, wherein a remaining adjusting screw is provided thereon with a compression spring to bring said yoke and said retainer into contact with each other.

14. A galvanomirror unit according to claim 13, wherein said three adjusting screws are located inside a circular portion of said recess in contact with said abutting portion of said yoke.

15. A galvanomirror unit according to claim 4, further comprising:
   an electromagnetic rotating mechanism provided between said torsion spring and said an immovable portion to adjust the direction of the galvanomirror.

16. The galvanomirror unit according to claim 1, further comprising a yoke to which said torsion spring is mounted, said mounting means including a spheric zone section positioned on one of said support structure and said yoke, and a mating recess positioned on the other one of said support structure and said yoke.

17. An optical disc apparatus comprising:
   a laser source for emitting a laser beam;
   a galvanomirror unit which includes a galvanomirror for reflecting the laser beam onto an optical disc; and
   a driving mechanism which adjusts a position of said galvanomirror to change a direction a light reflected by said galvanomirror, said driving mechanism having a torsion spring to which said galvanomirror is secured, said torsion being made of a leaf spring and having a major surface lying in a plane substantially parallel with a direction of gravity when in a free state, and
   means for mounting said torsion spring to a support structure, said mounting means including a spheric zone section defined with respect to one of said support structure and said torsion spring, and a mating recess defined with respect to the other one of said support structure and said torsion spring.

18. An optical disc apparatus according to claim 17, wherein the galvanomirror reflects said laser beam emitted from said laser source to make the laser beam incident upon said optical disc.

19. An optical disc apparatus according to claim 18, further comprising:
   an objective lens which converges the laser beam onto a predetermined track after being reflected by said galvanomirror in a radial direction of said optical disc.

20. An optical disc apparatus according to claim 19, further comprising:
   a reflecting mirror for reflecting said laser beam reflected by said galvanomirror toward said objective lens.

21. An optical disc apparatus according to claim 20, wherein said reflecting mirror and said objective lens are together movable in said radial direction of said optical disc.

22. The optical disc apparatus according to claim 17, further comprising a yoke to which said torsion spring is mounted, said mounting means including a spheric zone section positioned on one of said support structure and said yoke, and a mating recess positioned on the other one of said support structure and said yoke.

23. An optical disc apparatus comprising:
   a light gathering optical system for gathering a laser beam onto a laser disc; and
   a galvanomirror unit within said light gathering optical system, including a galvanomirror whose angular position is adjusted to accurately collect the laser beam onto a predetermined track of said optical disc in accordance with a tracking error signal corresponding to an off-set value of said laser beam from said track;
   said galvanomirror unit having a torsion spring to which said galvanomirror is secured, said torsion spring being made of a leaf spring and having a major surface lying in a plane substantially parallel with a direction of gravity when in a free state, and
   means for mounting said torsion spring to a support structure, said mounting means including a spheric zone section defined with respect to one of said support structure and said torsion spring and a mating recess defined with respect to the other one of said support structure and said torsion spring.

24. An optical disc apparatus according to claim 23, comprising:
   an immovable portion to which opposite ends of said torsion spring are secured.

25. An optical disc apparatus according to claim 24, wherein said galvanomirror is secured to an intermediate portion of said torsion spring.

26. An optical disc apparatus according to claim 25, further comprising:
   an electromagnetic drive mechanism provided between said torsion spring and said immovable portion to twist said torsion spring and thereby change a direction of said galvanomirror.

27. The optical disc apparatus according to claim 23, further comprising a yoke to which said torsion spring is mounted, said mounting means including a spheric zone section positioned on one of said support structure and said yoke, and a mating recess positioned on the other one of said support structure and said yoke.

28. A galvanomirror unit in which a laser beam emitted from a laser source is reflected towards an objective lens which is linearly moved in a radial direction of an optical disc, comprising:
   a torsion spring in the form of a leaf spring which is supported at its opposite ends and having a major surface which lies in a plane substantially parallel with a direction of gravity;
   a galvanomirror which is supported on an intermediate portion of said torsion spring to be angularly deflected about a horizontal axis, and
   means for mounting said torsion spring to a support structure, said mounting means including a spheric zone section defined with respect to one of said support surface and said torsion spring, and a mating recess defined with respect to the other one of said support structure and said torsion spring.

29. The galvanomirror unit according to claim 28, further comprising a yoke to which said torsion spring is mounted, said mounting means including a spheric zone section positioned on one of said support structure and said yoke, and mating recess positioned on the other one of said support structure and said yoke.

* * * * *

UNITED STATES PATENT AND TRADEMARK OFFICE
CERTIFICATE OF CORRECTION

PATENT NO. : 5,249,173
DATED : September 28, 1993
INVENTOR(S) : Akihiro TANAKA

It is certified that error appears in the above-indentified patent and that said Letters Patent is hereby corrected as shown below:

At column 6, line 3 (claim 1, line 3) of the printed patent, change "the" to ---a---.

Signed and Sealed this

Fifth Day of September, 1995

Attest:

BRUCE LEHMAN

*Attesting Officer*    *Commissioner of Patents and Trademarks*